United States Patent Office 3,087,785
Patented Apr. 30, 1963

3,087,785
METHOD OF MAKING SYNTHETIC MICA
Philip S. Hessinger, West Caldwell, and Thomas W. Weber, Woodbridge, N.J., assignors to Mycalex Corporation of America, Clifton, N.J., a corporation of New York
No Drawing. Filed Feb. 15, 1962, Ser. No. 173,371
33 Claims. (Cl. 23—110)

This invention relates to a method of making synthetic mica and particularly to a method of making synthetic fluor-phlogopite mica.

In recent years practical methods of manufacturing synthetic mica have been developed. Basically, the methods employed for making synthetic mica are to introduce into a furnace shell raw batch materials of such composition that they provide the necessary molecular percentages for the final mica product, heating said raw materials until the raw materials melt, and thereafter cooling the materials to permit the mica to crystallize out of the liquid melt. Substantially 100% of the final pig is mica. The preferred method of heating the batch materials is by internal resistance heating such as is disclosed in U.S. Patent No. 2,711,425, issued to R. A. Humphrey on June 21, 1955, for Electric Furnace and Electric Melting and Crystallizing Method for Minerals. The final mica made by the Humphrey method or other similar methods is in the form of a huge chunk or pig which is difficult to break up into usable plate-like crystals of mica. The chunk or pig of synthetic mica resulting from the Humphrey method is extremely tough and resists breaking up into the plate-like crystals which are commercially usable. Various methods of breaking up such a pig have been employed but most of them result in the breaking up of relatively large crystals into small crystals which have less commercial value. Moreover, in the Humphrey patent it is necessary to achieve temperatures in the furnace equal to or above the melting temperature of the mica being made. These temperatures are extremely high. For instance, the melting point of fluor-phlogopite mica is 1365° C.

It is therefore one object of the present invention to provide a new and improved method for manufacturing synthetic mica.

Another object of the present invention is the provision of a new and improved method for manufacturing synthetic mica, wherein the crystal growth of the synthetic mica can be closely controlled.

Still another object of the present invention is the provision of a new and improved method for manufacturing synthetic mica, which method permits said manufacture at temperatures below the melting point of the mica.

Yet another object of the present invention is to provide a method of crystallizing mica.

Another object of the present invention is to provide a method of crystallizing mica from a solvent therefor.

A further object of the present invention is to provide a method of recrystallizing mica.

Still a further object of the present invention is to provide a method of recrystallizing synthetic mica from a solvent therefor.

Yet a further object of the present invention is to provide a method of recrystallizing synthetic non-hydroxyl mica, such as fluor-phlogopite mica.

The above and other objects, characteristics and features of the present invention will be more fully understood from the following detailed description.

Mica is a siliceous crystalline material which is commonly found in nature. Most of the mica found in nature includes water of constitution or hydroxyl (OH) ions. An example of a hydroxyl mica is muscovite mica which has the formula $KAl_3Si_3O_{10}(OH)_2$. The aforementioned Humphrey method is best adapted to make non-hydroxyl micas, that is, micas wherein ions other than hydroxyl replace or are substituted for the hydroxyl ions generally found in natural mica. The most common substitute for the hydroxyl ions are ions of the halogen group, preferably fluorine. Perhaps the most common mica made synthetically is normal fluor-phlogopite mica which has the chemical formula $$KMg_3AlSi_3O_{10}F_2.$$

Other examples of non-hydroxyl micas are lithium tetrasilicic fluor-phlogopite mica which is expressed by the formula $KMg_2LiSi_4O_{10}F_2$ and barium di-silicic fluor-phlogopite which is expressed by the formula $$BaMg_3Al_2Si_2O_{10}F_2.$$

Numerous other non-hydroxyl micas may be made. As is true with the Humphrey method, the present method is adapted for manufacturing synthetic non-hydroxyl micas such as, for instance, synthetic normal fluor-phlogopite mica. The following detailed description of the method forming the present invention will be in connection with the manufacture of synthetic normal fluor-phlogopite mica. However, it will be understood that the present method may also be employed to manufacture other synthetic non-hydroxyl micas such as, for instance, those mentioned above.

In the following description and in some of the claims annexed thereto the term "mica forming material" will be employed. As used herein, the term "mica forming material" will mean mica and non-micaceous materials which are combinable to form mica. Furthermore, as used herein, the term "lithium borate glass forming material" means both lithium borate glass and raw materials which when melted form a molten lithium borate glass.

We have recently discovered that non-hydroxyl mica forming material such as normal fluor-phlogopite mica or materials stoichiometrically equivalent thereto are soluble in lithium borate glass. With this discovery, a means and method for crystallizing and recrystallizing synthetic normal fluor-phlogopite mica is present.

In accordance with one embodiment of the present invention, a batch of raw materials which have the stoichiometric content of mica and which are combinable to form mica are dissolved in heated lithium borate glass and after the batch materials have gone into solution, the lithium borate glass may be cooled whereby to saturate the solution and cause mica crystals to precipitate out of solution. Numerous combinations of batch materials may be employed for making any given mica. An example of a raw batch which has the various constituents of normal fluor-phlogopite mica in proper stoichiometric proportions is presented below:

| | Percent |
|---|---|
| Potassium silico fluoride ($K_2SiF_6$) | 19.77 |
| Potash feldspar ($KAlSi_3O_8$) | 18.47 |
| Silica ($SiO_2$) | 24.26 |
| Alumina ($Al_2O_3$) | 8.95 |
| Magnesia (MgO) | 28.55 |

Other combinations of raw materials forming a mica batch may readily be worked out by anyone skilled in the art. The lithium borate glass which acts as a solvent for the mica batch may have a composition which falls within the following ranges.

| | Percent |
|---|---|
| Lithium oxide ($Li_2O$) | 60 to 82 |
| Boron trioxide ($B_2O_3$) | 40 to 18 |

Preferably, the lithium borate glass is composed essentially of 71% $Li_2O$ and 29% $B_2O_3$.

In lieu of using lithium oxide and boron trioxide as the raw materials to form the lithium borate glass solvent the lithium borate glass may be formed by reacting lithium carbonate with boron trioxide in which event, during smelting, the lithium carbonate breaks down into lithium oxide and carbon dioxide, the latter of which is evolved as a gas. Suitable ranges of such raw materials to form the sodium metaborate glass are as follows:

| | Percent |
|---|---|
| Lithium carbonate ($Li_2CO_3$) | 70 to 94 |
| Boron trioxide ($B_2O_3$) | 6 to 30 |

If such raw materials are employed preferable solvent will be made by smelting 82% lithium carbonate with 18% boron trioxide.

In accordance with another aspect of the present invention, normal fluor-phlogopite mica crystals are ground to a very fine powder, preferably sufficiently fine to pass through a 100 mesh sieve. The powdered normal fluor-phlogopite mica is then mechanically mixed with powdered lithium borate frit, preferably sufficiently fine to pass through a 100 mesh sieve. The lithium borate glass may be made by conventional fritting methods and may be composed of the same ratios previously mentioned, and preferably the preferred ratio.

In lieu of combining mica or raw batch with lithium borate frit these materials can be mixed with the raw materials which will yield the lithium borate glass solvent. That is, ground crystalline synthetic fluor-phlogopite mica can be mixed with lithium oxide and boron trioxide in the proportions set forth above (or with lithium carbonate and boron trioxide as set forth above) and heated, in which event the raw materials to form the lithium borate will melt and give the same molten glass system. In the alternative, the raw batch materials to form synthetic mica may be mixed with raw batch materials to form the lithium borate glass and then heated, in which event the same solution will result. Further, as will become more apparent hereinafter, the glass may be made molten prior to mixing with mica forming material or in lieu thereof the glass forming material may be mixed with the mica forming material prior to heating.

The method of the present invention is identical for both mica forming materials and glass forming materials. Thus, after the glass and the mica forming material have been well mixed by any suitable mechanical means or by hand mixing, the mixture is put into a container such as a platinum or ceramic crucible and heat is applied. The method of heating may be any suitable method but preferably, the crucible containing the mixture of mica forming material and frit is placed in an oven.

We have discovered that lithium borate frit falling within the ranges disclosed above melts at about 840° C. At about 1100° C. the lithium borate glass will dissolve about 30% by weight of mica forming material: at about 1250° C. the lithium borate glass will dissolve about 50% by weight of mica forming material: and at about 1300° C. the lithium borate glass will dissolve about 80% by weight of mica forming material. At 1365° C. as much mica as desired can be put into solution as normal fluor-phlogopite mica is liquid at that temperature. We prefer to heat the mixture to about 1250° C. at which temperature the lithium borate glass solvent will dissolve about 50% by weight of the mica forming material since above 1250° C. the lithium volatilizes out of the lithium borate glass to thus create a substantial health hazard.

The mixture is held at the preferred temperature (1100° C. to 1300° C. and preferably 1250° C.) preferably until all of the mica forming material is dissolved in the molten glass. The complete dissolution of the mica batch in the glass may be determined by removing a small amount of the molten material and rapidly quenching it, such as in water. Thereafter, a microscopic examination of the quenched material will reveal whether any raw material crystals are present. If no raw material crystals are present, then it may be presumed that all of the mica batch has been dissolved. On the other hand, the complete dissolution of the powdered synthetic mica in the glass may be determined by quenching and determining by microscopic examination whether any mica crystals are present. Similarly, if no mica crystals are present then it may be presumed that all of the mica has been dissolved. However, if there are some raw material crystals or synthetic mica crystals still present, then the molten mixture is maintained at the desired temperature until the quench test indicates either total dissolution of the entire mica forming material, or that no more mica forming material can be dissolved.

After the mica forming material has been dissolved in the molten glass, the furnace may be shut off so as to permit a cooling of the entire molten mixture. As the solution cools, it, of course, is unable to hold in solution as much mica forming material as it was able to hold at the predetermined temperature. Accordingly, in one case the dissociated ions from the raw batch materials combine to form mica crystals, which precipitate or crystallize out of the molten lithium borate. In the other case, the dissociated ions from the ground up mica combine to form synthetic mica crystals which precipitate or recrystallize out of the molten lithium borate glass. Since the mica crystals in both instances have a higher specific gravity than the lithium borate glass, they tend to sink to the bottom where they may be recovered in a number of ways which will readily suggest themselves to persons skilled in the art.

The sizes of the mica crystals precipitating out of the solution may be controlled by controlling the rate of cooling, the slower the cooling the larger the crystals. If desired, the contents of the crucible may be cooled to some predetermined temperature such as, for instance, 1200° C. to 1250° C. and maintained at said temperature to permit the slow crystallization or recrystallization of the mica out of the solution and to further permit mica crystals to rise to the top of the relatively heavy lithium borate glass. The holding temperature is dependent on the amount of mica forming material in solution and the amount of mica it is desired to get out of solution. The temperature at which the solution is held during the crystallizing or recrystallizing period should be such as to provide a lithium borate glass which is sufficiently viscous to prevent its flowing through the pores of the crucible but not so viscous as to retard the growth of the mica crystals.

We have further found that as the mica crystallizes or recrystallizes out of the lithium borate glass, the lithium borate glass tends to get less viscous, provided the temperature is kept constant. Accordingly, as another alternative embodiment of the present invention, instead of maintaining the lead borate solution at a constant temperature during the period of crystallization, the temperature of the solution may be gradually lowered whereby to maintain a constant viscosity of the liquid phase of the solution.

In lieu of mixing the ground frit with the powdered mica forming material before heating, the frit may be heated to the desired temperature and said mica forming material may be then introduced into the molten glass where it is dissolved as described above. In order to get a maximum amount of mica forming material into solution, it is desirable to stir the liquid while introducing the raw batch materials into already melted glass, that a more rapid dissolution of the mica batch material can be obtained by adding the oxides, i.e. $SiO_2$, $Al_2O_3$, and $MgO$, before adding the potassium silico fluoride and potash feldspar.

Regardless of whether or not the mica forming material is introduced before the lithium borate glass forming material is melted or after the melting of the lithium borate glass, the present method can be made continuous by adding mica forming material to the molten liquid after mica crystals have been removed from the solution as by scooping them off the top thereof and then raising the temperature of the liquid to dissolve the additional material. Accordingly, the entire method can be made to operate on a continuous basis and, in fact, it is possible to automatically control the entire process so that after the molten glass solution has been cooled to precipitate out mica, apparatus may be actuated to add mica forming material and then to raise the temperature of the solution and hold the solution at an elevated temperature until all the mica forming material is dissolved, and thereafter, to lower the temperature of the solution to precipitate out additional mica crystals.

In lieu of scooping the mica crystals off the top of the lithium borate solution as described above, the lithium borate with the mica crystals dispersed therein may be slowly cooled to a temperature where it hardens. Thereafter, the lithium borate glass may be dissolved in any suitable solvent such as a 5% solution of acetic acid, which solvent will not attack the mica. Accordingly, the lithium borate glass will be removed by the solvent and the mica crystals will remain.

It should be understood that as used herein the term "crystallization" is meant to include the term "recrystallization." That is, if the mica forming material is itself mica then what is actually achieved by this method is first a dissociation of the mica and then a reforming of the mica crystals which may be termed "recrystallization." This is to be contrasted with the formation of mica crystals by the dissolution of non-micaceous raw batch materials stoichometrically equivalent to mica and then the formation of mica crystals from the dissociated ions of the raw batch material, which latter process may specifically be denoted as crystallization. However, for convenience, and since the actual formation of the crystals in both the instances comes from dissociated ions the word "crystallization" is deemed to cover both.

The present method has a number of advantages over the methods hereinbefore employed to make synthetic mica. Among these advantages are the fact that the rate of crystallization or recrystallization of the mica can be controlled by controlling the temperature of the solution and the viscosity thereof. Moreover, by controlling the rate of cooling, the size of the mica crystals can be controlled. Another important advantage of the present invention is that the manufacture of synthetic mica can take place substantially below the temperature heretofore necessary to manufacture synthetic mica. Another additional advantage of the present invention, as has been pointed out hereinbefore, is that the present method for making synthetic mica can be substantially continuous as contrasted with the batch methods heretofore employed.

Although the detailed description presented above was confined mainly to crystallizing and recrystallizing synthetic normal fluor phlogopite mica, it will be understood that the above method will work for other non-hydroxyl micas, such as other synthetic fluor-micas.

While we have herein shown and described several forms of the present invention and have suggested various changes and modifications therein, it will be understood that various other changes and modifications may be made therein within the scope of the appended claims without departing from the spirit and scope of this invention.

What we claim is:

1. A method of making synthetic non-hydroxyl mica, comprising the steps of dissolving non-hydroxyl mica forming material in heated lithium borate glass and then cooling the resulting solution to cause said mica to precipitate out of solution.

2. A method of making synthetic non-hydroxyl mica, comprising the steps of dissolving non-hydroxyl mica forming material in lithium borate glass heated to a temperature between about 840° C. and 1365° C. and then cooling the resulting solution to cause said mica to precipitate out of solution.

3. A method of making synthetic non-hydroxyl mica, comprising the steps of dissolving non-hydroxyl mica forming material in lithium borate glass consisting essentially of 60% to 82% lithium oxide and 40% to 18% boron trioxide heated to a temperature between about 840° C. and 1365° C. and then cooling the resulting solution to cause said mica to precipitate out of solution.

4. A method of making synthetic non-hydroxyl mica, comprising the steps of dissolving raw materials which contain constituents chemically combinable to form said mica in heated lithium borate glass, and then cooling the resulting solution to cause said mica to precipitate out of solution.

5. A method of making synthetic fluor-mica, comprising the steps of dissolving raw materials which contain constituents chemically combinable to form said mica in heated lithium borate glass, and then cooling the resulting solution to cause said mica to precipitate out of solution.

6. A method of making synthetic fluor-phlogopite mica, comprising the steps of dissolving raw materials which contain constituents chemically combinable to form said mica in heated lithium borate glass, and then cooling the resulting solution to cause said mica to precipitate out of solution.

7. A method of making synthetic normal fluor-phlogopite mica, comprising the steps of dissolving raw materials which contain constituents chemically combinable to form said mica in heated lithium borate glass, and then cooling the resulting solution to cause said mica to precipitate out of solution.

8. A method of making synthetic normal fluor-phlogopite mica, comprising the steps of dissolving raw materials which contain constituents chemically combinable to form said mica in heated lithium borate glass, and then cooling the resulting solution to cause said mica to precipitate out of solution, said lithium borate glass consisting essentially of from 60% to 82% lithium oxide and 40% to 18% boron oxide.

9. A method of making synthetic normal fluor-phlogopite mica, comprising the steps of dissolving raw materials which contain constituents chemically combinable to form said mica in lithium borate glass heated to above 840° C. and then cooling the resulting solution to cause said mica to precipitate out of solution.

10. A method of making synthetic normal fluor-phlogopite mica, comprising the steps of dissolving raw materials which contain constituents chemically combinable to form said mica in lithium borate glass heated to between 1100° C. and 1300° C. and then cooling the resulting solution to cause said mica to precipitate out of solution.

11. A method of making synthetic normal fluor-phlogopite mica, comprising the steps of heating lithium borate glass consisting essentially of about 60% to 82% lithium oxide and about 40% to 18% boron trioxide to between about 1100° C. and 1300° C., dissolving raw materials which contain constituents chemically combinable to form said mica in said lithium borate glass, and then cooling the resulting solution to cause said mica to precipitate out of solution.

12. A method of making synthetic fluor-phlogopite mica, comprising the steps of heating lithium borate glass consisting essentially of about 60% to 82% lithium oxide and about 40% to 8% boron trioxide to between about 1100° C. and 1300° C., dissolving raw materials which contain constituents chemically combinable to form said mica in said lithium borate glass, and then cooling the resulting solution to cause said mica to precipitate out of solution.

13. A method of making synthetic normal fluor-phlogopite mica, comprising the steps of heating lithium borate glass to between about 1100° C. and 1300° C., adding raw batch material consisting essentially of about 19.77% potassium silico fluoride, 18.47% potash feldspar, 24.26% silica, 8.95% alumina and 28.55% magnesia to said lithium borate, dissolving at least some of said batch material in said heated lithium borate glass, and then cooling said solution to cause normal fluor-phlogopite mica to precipitate out of said solution.

14. A method of making synthetic normal fluor-phlogopite mica, comprising the steps of heating lithium borate glass consisting essentially of about 60% to 82% lithium oxide and 10% to 18% boron trioxide to between about 1100° C. and 1300° C., adding raw batch material consisting essentially of about 19.77% potassium silico fluoride, 18.47% potash feldspar, 24.26% silica, 8.95% alumina and 28.55% magnesia to said lithium borate glass, dissolving at least some of said batch material in said heated lithium borate glass, and then cooling said solution to cause normal fluor-phlogopite mica to precipitate out of said solution.

15. A method of making synthetic normal fluor-phlogopite mica, comprising the steps of heating lithium borate glass consisting essentially of about 71% lithium oxide and 29% boron trioxide to between about 1100° C. and 1300° C., adding raw batch material consisting essentially of 19.77% potassium silico fluoride, 18.47% potash feldspar, 24.26% silica, 8.95% alumina and 28.55% magnesia to said lithium borate, dissolving at least some of said batch material in said heated lithium borate glass, and then cooling said solution to cause normal fluor-phlogopite mica to precipitate out of said solution.

16. A method of making synthetic normal fluor-phlogopite mica, comprising the steps of heating lithium borate glass consisting essentially of about 71% lithium oxide and 29% boron trioxide to about 1050° C., adding raw batch material consisting essentially of about 19.77% potassium silico fluoride, 18.47% potash feldspar, 24.26% silica, 8.95% alumina and 28.55% magnesia to said lithium borate glass, dissolving at least some of said batch material in said heated lithium borate glass, and then cooling said solution to cause normal fluor-phlogopite mica to precipitate out of said solution.

17. A method of making synthetic normal fluor-phlogopite mica, comprising the steps of heating lithium borate glass to above 90° C., taking raw batch material consisting essentially of potassium silico fluoride, potash feldspar, silica, alumina and magnesia, first adding to and dissolving in said heated lithium borate glass the silica, alumina and magnesia, then adding to and dissolving in said heated lithium borate glass the potassium silico fluoride and potash feldspar, and then cooling said solution to cause normal fluor-phlogopite mica to precipitate out of said solution.

18. A method of making synthetic normal fluor-phlogopite mica, comprising the steps of heating lead borate glass consisting essentially of about 71% lithium oxide and 29% boron trioxide to about 1250° C., taking raw batch material consisting essentially of about 19.77% potassium silico fluoride, 18.45% potash feldspar, 24.26% silica, 8.95% alumina and 28.55% magnesia, first adding to and dissolving in said heated lithium borate glass the potassium silico fluoride and potash feldspar, and then cooling said solution to cause normal fluor-phlogopite mica to precipitate out of said solution.

19. A method of making synthetic non-hydroxyl mica, comprising the steps of dissolving batch materials consisting of constituents which chemically react to form said mica in heated lithium borate glass, and then cooling said solution to cause said mica to precipitate out of solution.

20. A method of making synthetic non-hydroxyl mica, comprising the steps of substantially totally dissolving raw materials containing constituents chemically combinable to form said mica in heated lithium borate glass, and then cooling said solution to cause said mica to precipitate out of said solution.

21. A method of recrystallizing non-hydroxyl mica, comprising the steps of heating lithium borate glass to a temperature between about 840° C. and 1365° C., dissolving mica in said heated lithium borate glass, and then cooling said solution to cause mica to precipitate out of said solution.

22. A method of recrystallizing fluor-mica comprising the steps of heating lithium borate glass to a temperature between about 840° C. and 1365° C., dissolving fluor-mica in said heated lithium borate glass, and then cooling said solution to cause fluor-mica to precipitate out of said solution.

23. A method of recrystallizing synthetic fluor-phlogopite mica, comprising the steps of heating lithium borate glass consisting essentially of from about 60% to 82% $Li_2O$ and from about 40% to 18% $B_2O_3$ to a temperature between about 840° C. and 1365° C., dissolving synthetic fluor-phlogopite mica in said heated lithium borate glass, and then cooling said solution to cause said mica to precipitate out of solution.

24. A method of recrystallizing synthetic fluor-phlogopite mica, comprising the steps of heating lithium borate glass consisting essentially of about 71% $Li_2O$ and about 29% $B_2O_3$ to a temperature between about 840°C. and 1365° C., dissolving synthetic fluor-phlogopite mica in said heated lithium borate glass, and then cooling said solution to cause said mica to precipitate out of said solution.

25. A method of recrystallizing synthetic fluor-phlogopite mica, comprising the steps of heating lithium borate glass consisting essentially of from about 60% to 82% $Li_2O$ and from about 40% to 18% $B_2O_3$ to a temperature between about 1100° C. and 1300° C., dissolving synthetic fluor-phlogopite mica in said heated lithium borate glass, and then cooling said solution to cause said mica to precipitate out of said solution.

26. A method of recrystallizing synthetic fluor-phlogopite mica, comprising the steps of heating lithium borate glass consisting essentially of from about 60% to 82% $Li_2O$ and from about 40% to 18% $B_2O_3$ to a temperature of about 1250° C., dissolving synthetic fluor-phlogophite mica in said heated lithium borate glass, and then cooling said solution to cause said mica to precipitate out of said solution.

27. A method of recrystallizing synthetic fluor-phlogopite mica, comprising the steps of heating lithium borate glass consisting essentially of about 71% $Li_2O$ and about 29% $B_2O_3$ to a temperature between about 1100° C. and 1300° C., dissolving synthetic fluor-phlogopite mica in said heated lithium borate glass, and then cooling said solution to cause said mica to precipitate out of said solution.

28. A method of recrystallizing synthetic fluor-phlogopite mica, comprising the steps of heating lithium borate glass consisting essentially of about 71% $Li_2O$ and about 29% $B_2O_3$ to a temperature of about 1250° C., dissolving synthetic fluor-phlogopite mica in said heated lithium borate glass, and then cooling said solution to cause said mica to precipitate out of said solution.

29. A method of recrystallizing synthetic fluor-phlogopite mica, comprising the steps of mixing powdered synthetic fluor-phlogopite mica together with powdered lithium borate frit, heating said mixture to a temperature between about 840° C. and 1365° C. to cause at least a part of said mica to dissolve in said lithium borate, and then cooling said solution to cause said mica to precipitate out of said solution.

30. A method of recrystallizing non-hydroxyl mica, comprising the steps of heating lithium borate glass consisting essentially of from about 60% to 82% $Li_2O$ and from about 40% to 18% $B_2O_3$ to a temperature between about 840° C. and 1365° C., dissolving non-hydroxyl mica in said heated lithium borate glass, and then cooling said solution to cause said mica to precipitate out of said solution.

31. A method of recrystallizing fluor-mica, comprising the steps of heating lithium borate glass consisting essentially of from about 60% to 82% $Li_2O$ and from about 40% to 18% $B_2O_3$ to a temperature between about 840° C. and 1365° C., dissolving fluor-mica in said heated lithium borate glass, and then cooling said solution to cause said mica to precipitate out of said solution.

32. A method of recrystallizing synthetic normal-fluor-phlogopite mica, comprising the steps of heating lithium borate glass consisting essentially of from about 60% to 82% $Li_2O$ and from about 40% to 18% $B_2O_3$ to a temperature between about 840° C. and 1365° C., dissolving synthetic normal fluor-phlogopite mica in said heated lithium borate glass, and then cooling said solution to cause said mica to precipitate out of said solution.

33. A method of recrystallizing non-hydroxyl mica, comprising the steps of dissolving said mica in lithium borate glass, and then cooling said solution to cause at least a portion of said dissolved mica to precipitate from said solution.

References Cited in the file of this patent

UNITED STATES PATENTS

| | | |
|---|---|---|
| 2,196,974 | Boughton | Apr. 16, 1940 |
| 3,011,868 | Moore | Dec. 5, 1961 |